United States Patent [19]

Takeuchi

[11] Patent Number: 5,163,875
[45] Date of Patent: Nov. 17, 1992

[54] TORSION SPRING TYPE DAMPER DISC

[75] Inventor: Hiroshi Takeuchi, Neyagawa, Japan

[73] Assignee: Kabushiki Kaisha Daikin Seisakusho, Osaka, Japan

[21] Appl. No.: 613,763

[22] PCT Filed: May 1, 1990

[86] PCT No.: PCT/JP90/00577
§ 371 Date: Dec. 7, 1990
§ 102(e) Date: Dec. 7, 1990

[87] PCT Pub. No.: WO90/13755
PCT Pub. Date: Nov. 15, 1990

[30] Foreign Application Priority Data
May 2, 1989 [JP] Japan .................................. 1-52354

[51] Int. Cl.⁵ .................................................. F16D 3/14
[52] U.S. Cl. .......................................... 464/64; 464/68; 192/106.2
[58] Field of Search ............... 464/64, 68, 66, 67; 192/106.2

[56] References Cited

U.S. PATENT DOCUMENTS

| 4,591,348 | 5/1986 | Takeuchi et al. | 464/64 |
| 4,891,033 | 1/1990 | Heyser | 464/68 |
| 4,959,039 | 9/1990 | Naudin | 464/66 |
| 4,969,855 | 11/1990 | Graton et al. | 464/63 |
| 5,052,978 | 10/1991 | Hanke | 464/68 X |

FOREIGN PATENT DOCUMENTS 9009532 8/1990 World Int. Prop. O. ........... 464/64

Primary Examiner—Daniel P. Stodola
Assistant Examiner—Tony A. Gayoso
Attorney, Agent, or Firm—Armstrong & Kubovcik

[57] ABSTRACT

A damper disc having torsion springs in series in window holes formed in the input side plate and outlet plate, a support structure disposed between the torsion springs composed of a pair of spring receiving members rotatably linked by a hinge part, and a sub-torsion spring compressively disposed between the spring receiving members and hinged apart with an annular linkage element for preventing outward projection in a radial direction by centrifugal force.

2 Claims, 4 Drawing Sheets

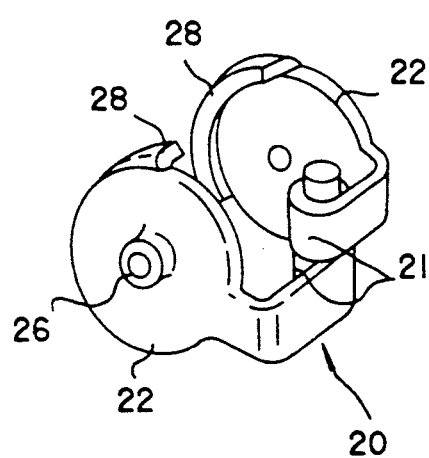
FIG.3
FIG.2
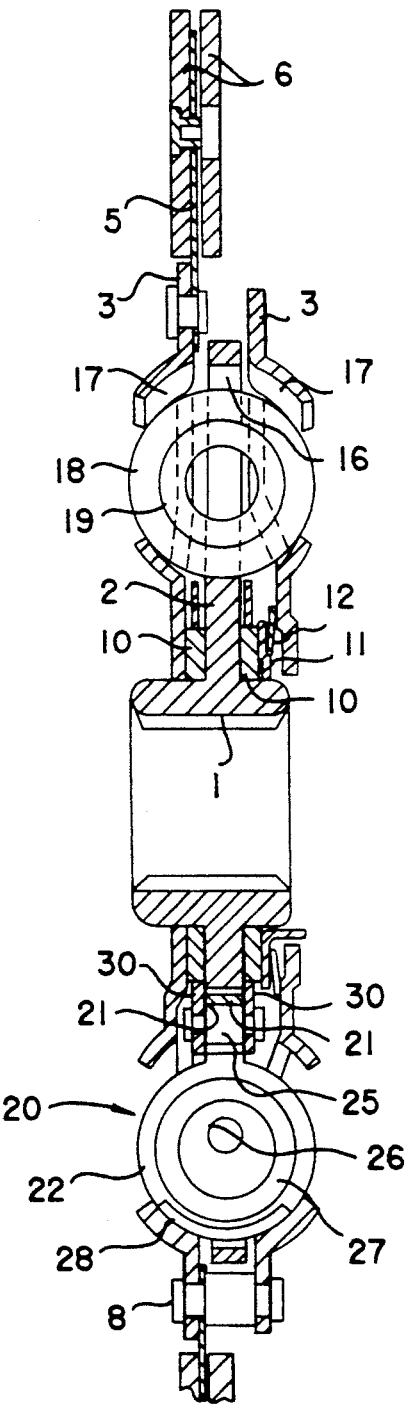

FIG.4
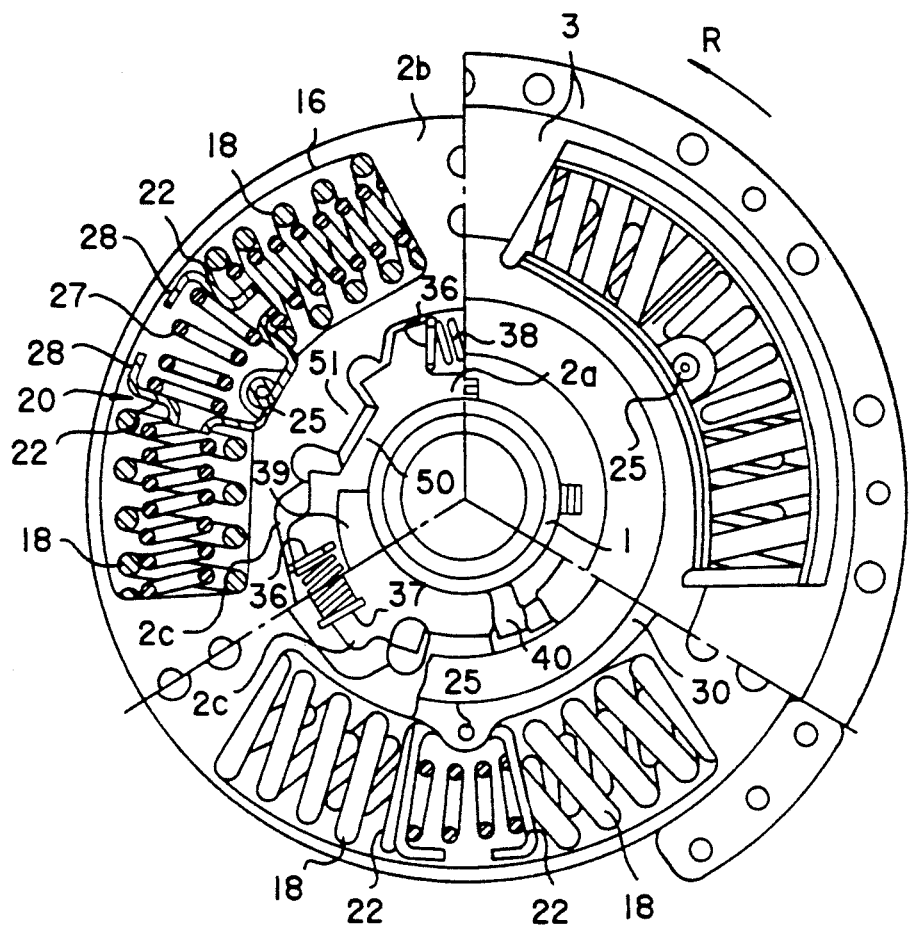
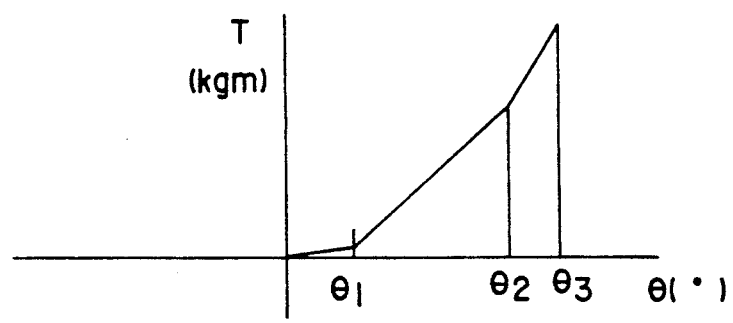
FIG.5

TORSION SPRING TYPE DAMPER DISC

DESCRIPTION

1. Technical Field

This invention relates to a damper disc having plural torsion springs arranged in series in one window hole.

2. Background Art

This kind of damper disc has two torsion springs disposed in series in a window hole in order to maintain a wide torsional angle range. A support member is intervening between the torsion springs in a manner free to move in the circumferential direction.

The present applicant, in the damper disc of the spring series type, as mentioned above, previously developed a structure of linking floats with an annular linkage element to prevent the support members from projection outward in the radial direction by centrifugal force, and filed applications (the Japanese Utility Model Applications Sho. 63-38836, Sho. 63-84777).

In the conventional damper disc, as shown in FIG. 6, herein, a support member 55 occupies a relatively large space in a window hole 16. The space in the window hole 16 can not be used economically and effectively even if the window hole 16 is formed in an extended circumferential length in order to obtain wide torsional ranges.

OBJECT OF INVENTION

An object of the invention is to increase the number of springs disposed in series in a window hole, to maintain a wider torsional angle range, or increase the energy generated in the damper area, by effectively utilizing the space for disposing the support member for disposing sub-torsion springs.

DISCLOSURE OF THE INVENTION

Technical Means

In order to accomplish above object, the invention presents a damper disc forming plural window holes, respectively, in a pair of input side plates and an output plate placed between the side plates, and disposing torsion springs in series in the window holes in a manner free to compress in the circumferential direction. Two torsion springs are disposed before and after in the circumferential direction in the window hole, and a spring support structure movable in the circumferential direction is intervening between the two torsion springs. A pair of spring receiving members, as spring support structure, are rotatably linked, through a hinge part, so that the gap in their circumferential direction may be freely reduced. A sub-torsion spring is compressively disposed between the two spring receiving members, thereby supporting each hinge part to an annular linkage element.

Operation of the Invention

When the input side plates are twisted to the output plate, while traveling, the gap of the two spring receiving members is reduced, and the sub-torsion spring is compressed. In succession, or at the same time, the two series torsion springs, at both sides, are compressed. In the cmpression stroke of the two torsion springs, the support structure moves in the circumferential direction.

At this time, each support structure has the internal circumferential end portion linked integrally by the annular linkage element, so that it will not contact with the peripheral edge of the window hole by projecting outward in the radial direction due to centrifugal force.

BRIEF DESCRIPTION OF DRAWINGS

FIG. 2 is a sectional view of II—II of FIG. 1.

FIG. 3 is a perspective view of support structure, before adjusting.

FIG. 4 is a partially cut-away side view showing an example of applying in a split hub type damper disc.

FIG. 5 is a torsion characteristic diagram of the structure in FIG. 4.

BEST MODE FOR CARRYING OUT THE INVENTION

Figure 1:
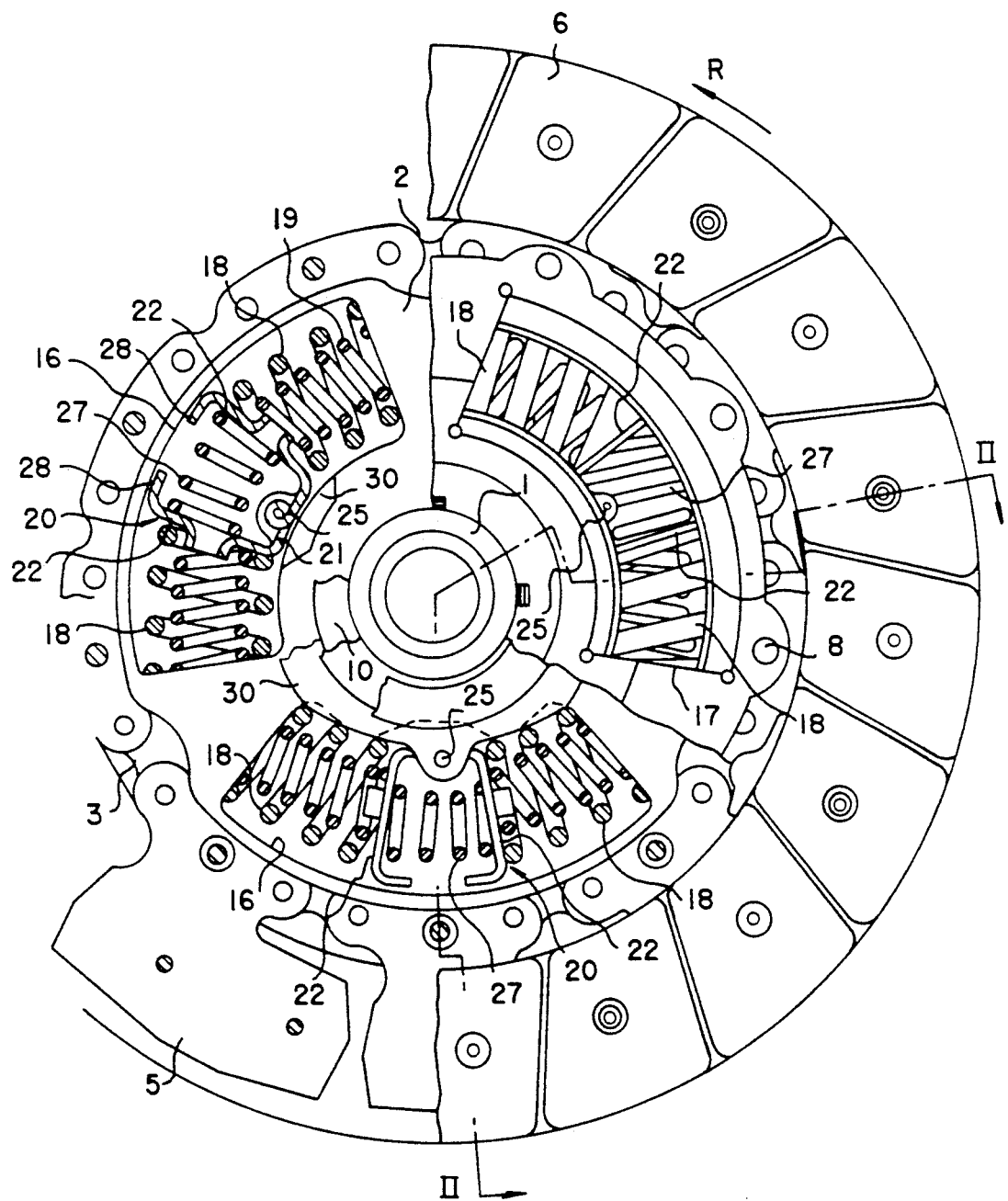
FIG. 1 is a partially cut-away side view showing a damper disc according to the invention (notch side view in view I of FIG. 2).
Figure 6:
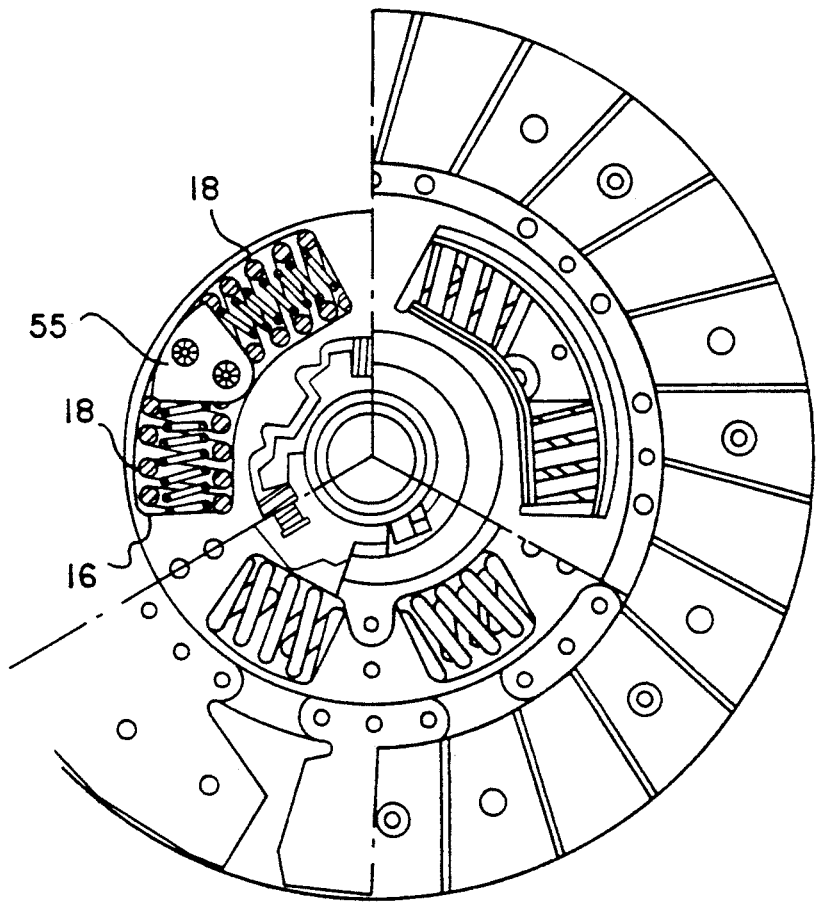
FIG. 6 is a side view of prior art.

In FIG. 2 showing a longitudinal sectional view of a damper disc according to the invention (a sectional view of II—II of FIG. 1), an output spline hub 1 is fitted with spline to an output shaft (not shown), and a flange (output plate) 2 extending outward in the radial direction. On both sides of the flange 2, in its axial direction, a pair of input side plates 3 are disposed and are coupled together with rivets 8 at their outer circumferential end portions. At the outer circumferential end portion of one side plate 3, plural cushioning plates 5 are affixed. Input facings 6 are affixed to opposite sides of cushioning plates 5. The input facings 6 are placed, for example, between flywheel and pressure plate, and a rotating force is applied.

Between the inner circumferential side part of both side surfaces of the flange 2 and the inner circumferential side part of each side plate 3, annular friction members 10 are disposed. Between one friction member 10 and the side plate 3, a holding plate 11 and a belleville spring 12 are disposed.

A torsion spring window hole 16 is formed in the flange 2. Correspondingly, a torsion spring window hole 17 is also formed in side plates 3. Torsion springs 18 are disposed in the window hole 16, 17 in a manner free to compress in the circumferential direction.

In FIG. 1, window holes 16, in the flange 2, are formed at three positions at equal intervals in the circumferential direction. Two torsion springs 18 are compressively disposed in series, before and after in the circumferential direction, in each window hole 16. Between the front and rear torsion springs 18, in the window hole 16, a support structure 20 is disposed movably in the circumferential direction. This torsion spring 18 is of master-slave spring type, with a slave spring 19 provided inside.

The window holes 17, in the side plates 3, are formed at three positions at equal intervals in the circumferential direction, corresponding to the arrangement of the window holes 16 in the flange 2.

The support structure 20 is composed of a pair of front and rear spring receiving members 22, spaced in the circumferential direction. The inner end portions, in the radial direction, of each spring received member 22 mutually extend to the opposite side members. At their front ends, pin boss parts 21 parallel to each output shaft center, are formed integrally on each of the side members. The pin boss parts 21 are fitted to a common pin 25, rotatably linking spring receiving members 22. By this rotation, the circumferential gap of the two spring receiving members 22 can be reduced.

Three pins 25, one for each support structure, are supported on an annular linkage element 30 coaxial with the clutch shaft center, so that the support structures 20, at three positions, can move in the circumferential direction, simultaneouly by the same angle, without projecting outward in the radial direction.

Between spring receive members 22, a sub-torsion spring 21 is disposed compressively in the circumferential direction. In this embodiment, the sub-torsion spring 27 has a weaker spring force than the front and rear torsion springs 18 so as to act as the damper member of the first stage.

FIG. 3 shows a perspective view of the support structure 20, in which each spring receive member 22 is formed in a circular shape so as to support the entire end portion of the torsion spring 18, a cylindrical protrusion 26 is formed in the middle part to project mutually to the opposite side of the confronting spring receiving member, and partially arc-shaped stopper/spring guide part 28 extending mutually to the opposite side member is integrally formed at the outer end portion in the radial direction.

The operation is described below. By the increase of rotating torque, when the side plates 3 are twisted to the side of the rotating direction R in the FIG. 1, for example, with respect to the flange 2, the spring receiving members 22 of each support structure 20 rotate about the pin 25 to approach each other, thereby compressing the sub torsion spring 27 as the first stage. When the stopper/spring guide parts 28 of each spring receiving members 22 abut against each other, further compression of sub-torsion spring 27 is terminated, and the front and rear torsion springs 18 are compressed as the second stage. In the compression stroke of the torsion spring 18, the support structure 20 in FIG. 1 moves in the direction of rotation R. By adjusting the set load of the springs 18, 27, three springs 18,27 can be compressed in the first stage, and only two torsion springs 18 can be compressed in the second stage.

In said torsion action, as the friction member 10, FIG. 2 makes contact, hysteresis torque is built up. Because the three support structures 20 are linked by the annular linkage members 30, they do not project outward in the radial direction.

OTHER EMBODIMENTS

FIG. 4 relates to an example of applying the invention to a so-called split hub type damper disk, that is, the flange (output plate) 2 of the spline hub is divided into an inner flange part 2a and an outer flange part 2b.

In the inner flange part 2a, a window hole (notch) 36 for the first stage is formed, and a bifurcate expanding part 2c is formed in the inner end part of the outer flange part 2b so as to cover the both sides in the axial direction of the inner flange part 2a. A window hole 37 for the first stage corresponding to the window hole 36 in the inner flange part 2a is formed in expanding part 2c.

In the window holes 36, 37, first stage torsion springs 38 of small spring contact are disposed compressively in the circumferential direction.

In the inner edge of the outer flange part 2b and outer edge of the inner flange part 2a, a convex part 51 and a concave part 50 mutually engagable with each other, are formed at a spacing in the circumferential direction.

Between the expanding part 2c of the outer flange part 2b and opposite sides of the inner flange part 2a, friction members 39 for the first stage with small frictional coefficient are disposed, and between the expanding part 2c and opposite side plates 3, friction members 40 for the second and third stages with large frictional coefficient are disposed. In this embodiment, the sub-torsion springs 27 are stronger than the first stage torsion springs 38, and are set, for example, at the same strength as the front and rear torsion springs 18.

The outer structure is same as in the form in FIG. 1, and the same parts are indentified with the same members.

The operation is described below. In the first stage (For example, when idling), the outer flange part 2b and side plates 3 are integrally twisted to the inner flange part 2a, for example, to the rotating direction R side, thereby compressing the first stage torsion springs 38. At this time, as the expanding part 2c of the outer flange part 2b and the first stage friction member 39 between the opposite sides of the inner flange part 2a contact with each other, a small hysteresis torque is built up.

Changing from idling to low speed traveling, as the torsional torque increases, the concave part 50 of the inner flange part 2a and the convex part 51 of the outer flange part 2b join to couple the both flange parts 2a, 2b into one body, and, in the second stage, the side plates 3 are twisted to the rotating direction R, thereby simultaneously compressing the three springs in series, that is the torsion spring 18 and 19 and sub-torsion spring 27. In the compression stroke of the second stage, the gap between the both spring receiving members 22 is narrowed, and the support structure 20 moves in the rotating direction R. At this time, as the side plates 3 and the second stage friction member 40 in the expanding part 2c of the outer flange part 2b contact with each other, a relatively large hysteresis is generated.

When the stopper/spring guide parts 28 of the both spring receiving parts 22 abut against each other, further compression of the sub-torsion spring 27 is over, and, in the third stage, only the front and rear torsion springs 18, 19 are compressed. In this process of the third stage, the spring constant of the three series springs is changed to the spring contact of two series springs, 18, 19 and therefore the spring strength is greater than in the second stage.

FIG. 5 shows the torsional characteristic in the embodiment in FIG. 4, in which the axis of ordinates T denotes the torque, and the axis of abscissas relates to the torsional angle. The torsional angle 0 to $\Theta 1$ refers to the first stage, and $\Theta 1$ to $\Theta 2$ to the second stage, and $\Theta 2$ to $\Theta 3$ to the third stage.

In the split hub type structure, as shown in FIG. 4, the sub torsion spring 27, stronger than the first stage torsion spring 38, may be replaced by a spring weaker than the torsion spring 18 or the sub torsion spring 27 may be replaced by a spring stronger than the torsion spring 18.

In both the first and second embodiments, final compression of the sub-torsion spring 27 occurs when the stopper/spring guide parts 28 of the spring receiving members 22 abut against each other, but sub-tension spring 27 may also be designed to finish the compression stroke by fully compressing the sub-torsion springs 27 before the guide parts 28 abut against each other.

EFFECT OF THE INVENTION

As decribed herein, the damper disc of the invention disposing springs in series in one window hole brings about the following effects:

(1) A pair of spring receiving members 22 are rotatably linked together through a hinge part so that the gap in the circumferential direction may be reduced freely, as the support structure disposed between two front and rear torsion springs 18, and a sub-torsion spring 27 compressive in the circumferential direction and disposed between the two spring receiving members 22, so that the number of springs to be disposed in series in one window hole may be increased and wider torsional angle may be obtained.

(2) The space within the support structure 20 is also used as the space for installing new sub-torsion spring 27, and it is not necessary to extend the circumferential length of the window hole 16 to extend the torsional angle, so that increase of size of damper disc and lowering of durability may be prevented.

(3) Further when the torsional angle range is set the same as the torsional angle range of the conventional type of two springs in series, the increasing rate of the torsional torque is raised, and the energy generation may be increased.

INDUSTRIAL APPLICATION

The number of springs disposed in series is increased, a wider torsional angle is obtained, and compression operation is stabilized, so that it is ideal as an autmotive damper disk.

What is claimed is:

1. A damper disc having axially aligned, circumferentially spaced, plural window holes, respectively, in a pair of input plates and in an output plate between said side plates, and torsion springs disposed in series in said window holes in a manner free to be compressed in the circumferential direction as said input plates are rotated relative to said output plate, wherein each of said axially aligned window holes have two torsion springs disposed before and after in the circumferential direction in each of said window holes, and a spring support structure, movable in the circumferential direction interposed between said before and after disposed torsion springs in each of said window holes, said spring support structure having a pair of spring receiving members rotatably linked through a hinge part so that the gap between said spring receiving members, in a circumferential direction of said support structure may be freely reduced, and a compressible sub-torsion spring disposed between said pair of spring receiving members and an annular linkage element supporting said hinge part.

2. A damper disc according to claim 1, wherein said output plate is divided into an inner flange part and an outer flange part, and a convex part and a concave part between said flange parts space apart at opposite circumferential ends for engagement as said outer flange part is rotated circumferentially relative to said inner flange part.

* * * * *